Aug. 10, 1943.  B. V. BEATTY  2,326,518
MEASURING INSTRUMENT FOR DETERMINING ANGLES AND THE LIKE
Filed Nov. 10, 1941   2 Sheets-Sheet 1

INVENTOR
Bennie V. Beatty
BY Arthur C. Brown, Jr.
ATTORNEY

Aug. 10, 1943.　　　　　B. V. BEATTY　　　　　2,326,518
MEASURING INSTRUMENT FOR DETERMINING ANGLES AND THE LIKE
Filed Nov. 10, 1941　　　　　2 Sheets-Sheet 2
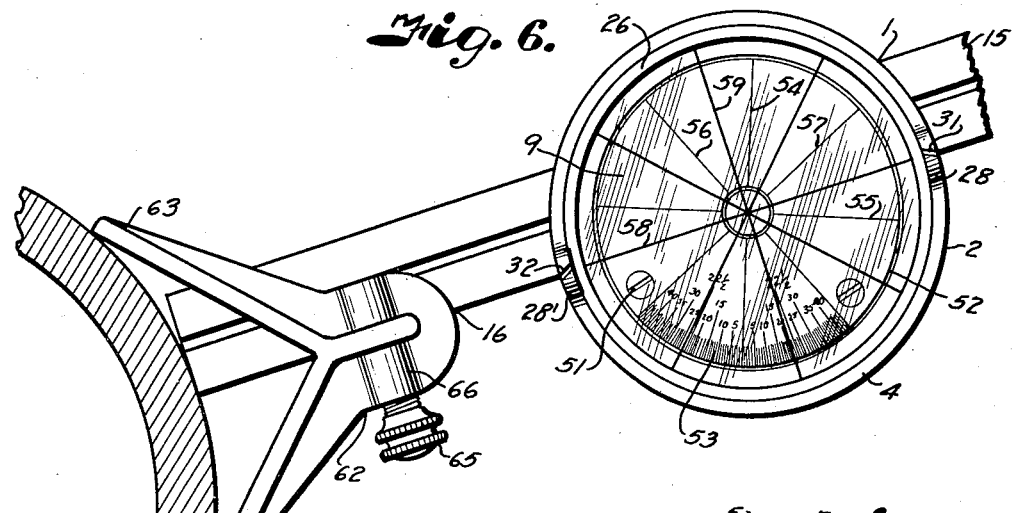
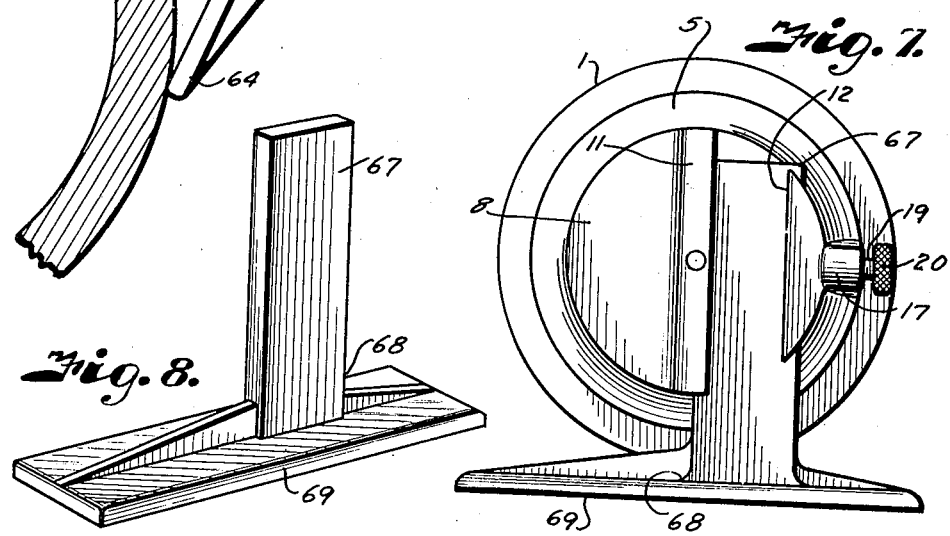
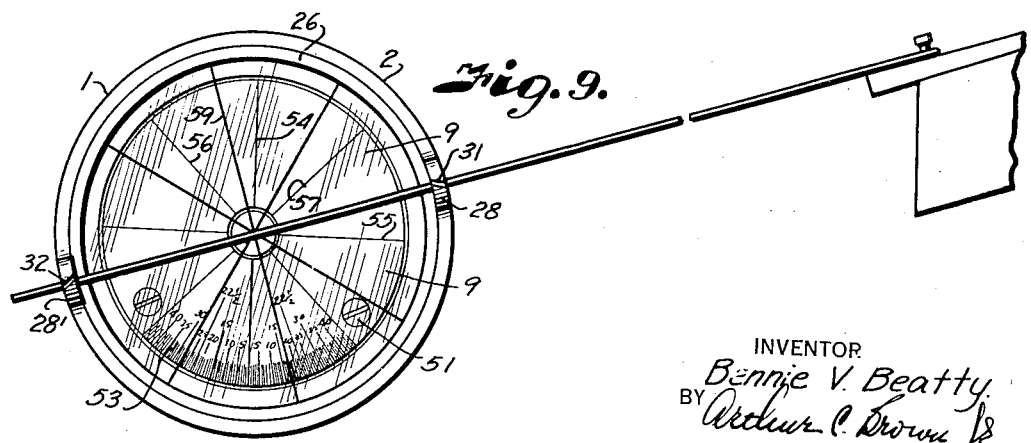
INVENTOR.
Bennie V. Beatty
BY Arthur C. Brown, Jr.
ATTORNEY Patented Aug. 10, 1943

2,326,518

UNITED STATES PATENT OFFICE 2,326,518

MEASURING INSTRUMENT FOR DETERMINING ANGLES AND THE LIKE

Bennie V. Beatty, Uniontown, Pa., assignor of three-eighths to R. E. Day and three-eighths to Charles B. Harter, both of Tulsa, Okla.

Application November 10, 1941, Serial No. 418,448

6 Claims. (Cl. 33—207)

This invention relates to a measuring instrument for determining angles, degrees of inclination, roof pitches, and the like, and has for its principal objects to provide a device of this character that is of simple construction, reliable in operation, and which may permit of closer tolerances when ascertaining measurements thereby.

Other objects of the invention are to provide an angle measuring instrument giving direct readings on both sides of a zero point of the dial thereof; to provide for interchange of dials so as to adapt the instrument to different types of work; to provide an instrument wherein the working parts are enclosed in a moisture-proof and air-tight casing; to provide an instrument adapted for attachment to the blade of a standard centering square or similar device; to provide the instrument with a movable dial actuated by means of a pendulum; to provide an instrument which, when applied to a centering square, may be used as a protractor; and to provide the instrument with means for attachment to a line for determining angularity between spaced points through which the line is stretched.

In accomplishing these and other objects of the invention, as hereinafter pointed out, I have provided improved details of structure, the preferred forms of which are illustrated in the accompanying drawings, wherein:

Fig. 6 is a front elevational view of the instrument as used in Fig. 1 but showing the centering head in position for measuring an angle 21 degrees from the horizontal.

Fig. 7 is a rear view of the instrument applied to a support whereby the instrument is adapted for use as a level or clinometer.

Fig. 8 is a perspective view of the support shown in Fig. 7.

Fig. 9 is a view of the instrument as applied to a line for determining slope between spaced points.

Figure 1:
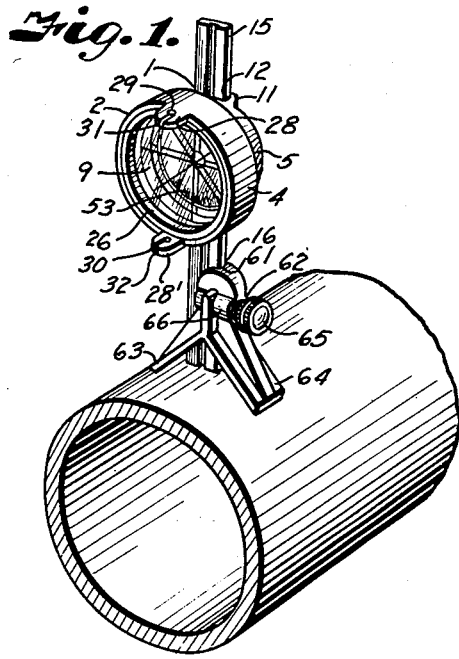
Fig. 1 is a perspective view of a measuring instrument constructed in accordance with the present invention and showing its application for determining angles of points circumferentially of a pipe or similar cylindrical object.
Figure 2:
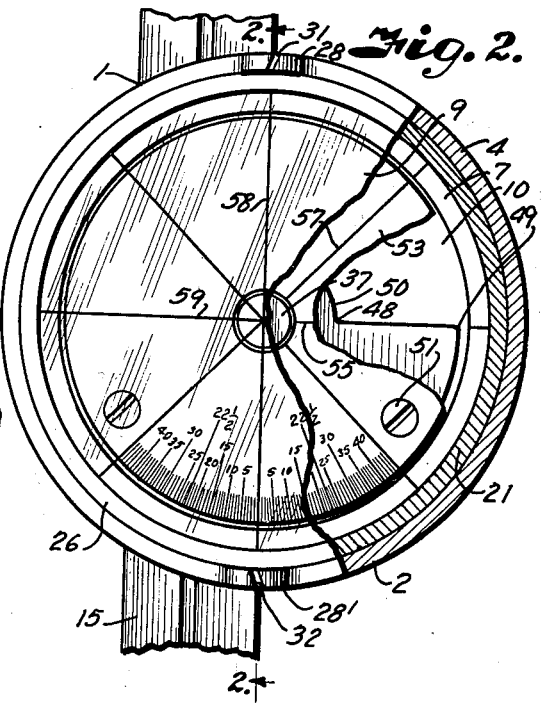
Fig. 2 is an enlarged front elevational view of the instrument, parts being broken away and shown in section to better illustrate the construction, the blade of the centering square being shown fragmentarily.
Figure 3:
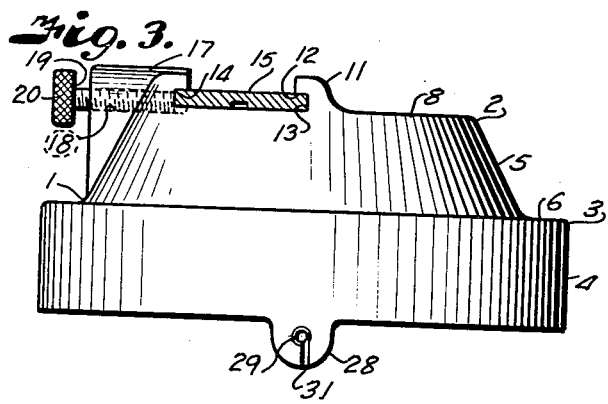
Fig. 3 is a plan view of the instrument.

Referring more in detail to the drawings:

I designates an angle measuring instrument embodying the features of the present invention and which includes a casing 2 having a circumferential wall 3 including a cylindrical portion 4 and a smaller but coaxial conical or tapered portion 5 connected by an offset 6 to form an annular recess and a seat 7 arranged in a plane transversely of the axis of the casing. The side of the casing having the conical portion 5 is closed by a disk-like end wall 8. The opposite side, however, is open to accommodate a lens 9. The casing thus forms a compartment 10 for enclosing the working parts of the instrument, later described.

Projecting from the outer face at one diametrical side of the end wall 8 is a boss 11 having a T-shaped slot 12 extending therethrough with one longitudinal edge 13 of the head portion of the slot located in an axial plane of the casing, the opposite edge 14 of the slot being spaced a sufficient distance to accommodate a blade 15 of a centering square 16, later described. Extending laterally of the casing and projecting from the conical wall portion 5 at the point of the boss 11 is a lug 17 having a threaded bore 18 in which is mounted a set-screw 19 for clamping engagement with the side edge of the blade 15 so as to retain the casing in any adjusted position along the length of the blade, the set-screw preferably being provided with a knurled knob 20 by which it may be readily rotated to and from clamping position.

Inset within the wall portion 4 and engaging the annular seat 7 is a spacing ring 21 supporting a gasket 22 which seats the rim of the lens 9 and which cooperates with a similar gasket ring 23 to seal the rim of the lens within the casing and prevent the entrance of moisture and other elements into the compartment 10 by way of the open side of the casing.

Figure 4:
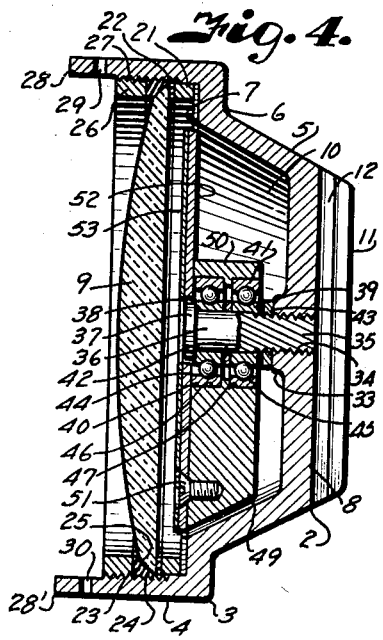
Fig. 4 is a vertical section through the instrument on the line 4—4 of Fig. 2, the instrument being removed from the blade of the centering square.

In order that the lens may be centered, the periphery thereof is provided with a bevel 24 which is engaged by a corresponding taper 25 of the gasket ring 23, as shown in Fig. 4.

The gasket ring 23 is retained in sealing engagement with the lens by means of a bezel 26 which is threaded into the open side of the casing as indicated at 27. The front or rim of the casing is further provided with lugs 28 and 28' arranged on opposite diametrical sides thereof and which are provided with openings 29 and 30 arranged with their axes in the axial plane of the casing. The lugs are further provided with biasly arranged entrance slots 31 and 32 whereby a line may be passed therethrough when the line is in loose condition and retained in the openings 29 and 30 when in taut condition, for a purpose later described.

Formed on the inner face of the wall 8, axially of the casing, is a boss 33, having a threaded bore 34 to mount the threaded shank 35 of a spindle 36. The spindle 36 has a head 37 to retain the inner races 38 and 39 of antifriction bearings 40 and 41 on the spindle, the inner races being spaced by a washer 42 and retained in clamped engagement between the head 37 and a lock washer 43 engaging the face of the boss 33 as shown in Fig. 4. The outer races 44 and 45 of the bearings are pressed into recesses 46 and 47 of a pendulum and dial assembly 48.

Figure 5:
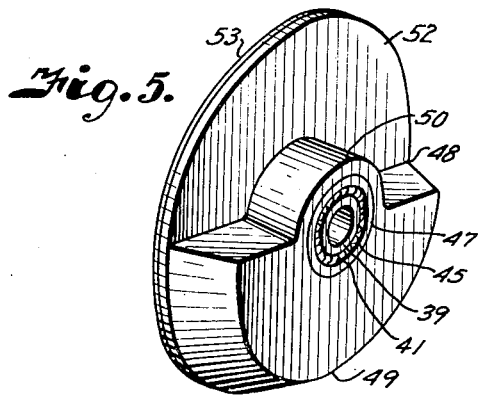
Fig. 5 is a perspective view of the dial and pendulum assembly.

The dial assembly 48 includes a pendulum 49 of segmental form and which has an internal hub 50 having the recesses accommodating the outer races of the bearings as shown in Fig. 5. Removably fixed to the pendulum by means of fastening devices, such as screws 51, is a disk 52 carrying a dial 53.

The markings on the dial 53 constitute an important part of the invention and include lines 54 and 55 which are arranged relatively to the pendulum so that the line 54 is perpendicular and the line 55 horizontal when the pendulum is at rest. The quadrants between the lines are in turn divided by lines 56 and 57. Perpendicular and horizontal lines 58 and 59 are also formed on the lens to indicate fixed quadrants through which the dial quadrants move when the pendulum shifts its position as the centering square is moved about a work-piece. The line 58 extends in parallel registry with one side edge of the blade 15.

The lower quadrants on the dial are provided with a series of graduations numbering from the right and left of the line 54 from 1 to 45 degrees to indicate the position of the dial relatively to one of the fixed lines 58 or 59 when the pendulum swings to rest after application of the instrument, as shown in Fig. 1 or 6, or when the instrument is applied to a line or cord 60, later described.

The center square illustrated is of standard construction and includes the blade 15 which is slidably mounted in a slot 61 of a centering head 62, the centering head having diverging legs 63 and 64 for engaging a work-piece such as a pipe. The centering head is adjustably positioned upon the blade by means of a thumb screw 65 that is threaded in a boss 66 of the head and which clampingly engages the blade as in the usual centering square construction.

If desired, the instrument described may be used for a level or clinometer by mounting it on a vertical post 67 of a supporting bracket 68 which has a foot portion 69, the sole face of which is located at right angles to the post 67, the instrument being applied to the post similar to its application on the blade of the centering square as shown in Fig. 7.

In using the instrument in connection with a centering square as shown in Figs. 1 to 6 inclusive, the blade of the square is passed through the T-shaped slot with the edges thereof engaging the ways. The instrument may be moved to any selected position on the square and adjustably retained upon tightening of the set-screw in which position the perpendicular line 58 registers with the edge of the blade extending through the juncture point of the legs 63 and 64 as shown in Fig. 6.

To find a top center on a pipe, as shown in Fig. 1, the thumb screw 65 is loosened so that the end of the blade engages the pipe at a point exactly midway between the ends of the legs which bear on the pipe, as shown in Fig. 6. When the line 54 on the scale registers with the perpendicular line 58 a point made on the pipe at the edge of the scale will be upon the exact perpendicular center of the pipe. By moving the device around the pipe to various predetermined points, as indicated by the graduations, other points may be located on the pipe in angular relation with the first point, the reading being made from the scale on the right or left depending upon which side of the pipe the instrument is moved. In the position shown in Fig. 6 it will be noted that the horizontal center line substantially registers with a 22½ degree graduation which indicates that the straight edge of the blade is approximately 22½ degrees above horizontal center since the 22½ degrees mark registers with the horizontal line 57. If the device is moved to the other side of the pipe to a similar position, a similar recording will be noted since the 22½ mark graduation of the scale registers with the opposite end of the line 57. Thus readings may be obtained on either side of the pipe directly in the number of degrees and no calculations are necessary.

The device may be used as a level by applying it upon the post 67. When the zero line of the scale registers with the perpendicular line on the lens, the foot 69 is in level position. Any inclination of the foot 69 will be indicated through movement of the pendulum which swings the dial to the number of degrees which the foot is out of level.

Should it be desired to determine the angle between two spaced points, the instrument may be applied to the line by passing the line through the bias slots so that it enters the openings 28 and 29. The line is then stretched between the points to be measured, whereupon the pendulum will swing so that the reading which registers with the perpendicular line on the lens will indicate the angle of the line with respect to the horizontal.

The removable dial makes it possible to adapt the instrument to the use of different tradesmen, as welders or lay-out men require one scale and tinners or carpenters might want a scale that reads in inches per foot. A dial graduated in inches per foot may be substituted for the dial illustrated.

From the foregoing it is obvious that the instrument is adapted for the use of pipe line welders in locating the cut-off points of a mitered pipe, the location of lateral openings to be formed in a pipe or other vessel, or the device may be used by steam fitters or the like in determining the angle of a pipe connecting spaced pipes located at different levels, or the device may be used by a carpenter, tinsmith, or other craftsman in determining the pitch of a roof or slope in inches per foot or other similar related measurements.

What I claim and desire to secure by Letters Patent is:

1. An instrument of the character described including an open front casing, means on the back of the casing for slidably mounting the casing on the blade of a centering square, and a pendulum actuated scale oscillatably supported in the casing and visible through said open front, said scale having lines extending transversely thereacross and said mounting means being positioned to register an edge of the blade with the axis of pendulum oscillation.

2. An instrument of the character described including an open front casing, means on the back of the casing for slidably mounting the casing on the blade of a centering square, a pendulum actuated scale oscillatably supported in the casing and visible through said open front, said scale having lines extending transversely thereacross and said mounting means being positioned relative to the axis of scale oscillation to register said lines with an edge of the blade, and a transparent panel closing the open front of the casing and having transverse lines corresponding to the lines on the scale, said panel being positioned in said casing with one of the lines thereon registering with said edge of the blade when the instrument is mounted on the blade.

3. An instrument of the character described including, a casing having a closed back with a marginal flange forming a pendulum and scale compartment, a spindle in the compartment having fixed support on said back, a pendulum oscillatably journalled on said spindle, a circular dial carried with the pendulum with the center thereof in registry with the axis of pendulum oscillation and having radial lines on the face thereof, said marginal flange of the casing having an annular recess in concentric relation with the axis of pendulum oscillation, a circular transparent panel having its marginal edge in said recess and having intersecting lines extending from the center thereof and having an annular bevel, centering means carried by said flange and having an annular bevel engaging the bevel of the panel, and a panel retaining ring threadedly engaging the marginal flange to urge said bevels into contact and to effect coaxial registry of the intersecting point of said lines on the panel with the axis of pendulum oscillation.

4. An instrument of the character described including, a casing having a closed back with a marginal flange forming a pendulum and scale compartment, a spindle in the compartment having fixed support on said back, a pair of anti-friction bearings fixed on said spindle, a pendulum oscillatably journalled on said bearings, a circular dial carried with the pendulum with the center thereof in registry with the axis of pendulum oscillation and having radial lines on a face thereof, an annular panel seat carried by said marginal flange of the casing having an annular recess in concentric relation with the axis of pendulum oscillation, a circular transparent panel having its marginal edge in said recess and having lines extending radially from the center thereof and having an annular bevel, centering means carried by said flange and having an annular bevel engaging the bevel of the panel, and a panel retaining ring threadedly engaging the marginal flange to urge said bevels into contact to effect registry of the intersecting point of said lines on the panel with the axis of pendulum oscillation.

5. An instrument of the character described including, a casing having a closed back with a marginal flange forming a pendulum and scale compartment, a spindle in the compartment having fixed support on said back, a pendulum oscillatably journalled on said spindle, a circular dial carried with the pendulum with the center thereof in registry with the axis of pendulum oscillation, said flange having an inner annular recess in coaxial relation with the axis of pendulum oscillation and forming an annular shoulder, a circular transparent panel having lines extending radially from the center thereof and having a bevelled edge, a gasket ring in said recess interposed between the panel and said shoulder, a gasket ring in the recess engaging the opposite side of the panel, one of said rings having a bevelled inner periphery engaging the bevel of the panel, and means engaging the marginal flange to secure said rings in sealing contact with the panel and casing to effect registry of the intersecting point of said lines on the panel with the axis of pendulum oscillation.

6. An instrument of the character described including, a casing having a closed back with a marginal flange forming a pendulum and scale compartment, a spindle in the compartment having fixed support on said back, a pair of anti-friction bearings fixed on said spindle, a pendulum journalled on said bearings, a circular dial carried with the pendulum with the center thereof in registry with the axis of pendulum oscillation, said flange having an inner annular recess in coaxial relation with the axis of pendulum oscillation and forming an annular shoulder, a circular transparent panel having lines extending radially from the center thereof and having a bevelled edge, a gasket ring in said recess interposed between the panel and said shoulder, a gasket ring in the recess engaging the opposite side of the panel, one of said rings having a bevelled inner periphery engaging the bevel of the panel, and means engaging the marginal flange to secure said rings in sealing contact with the panel and casing to effect registry of the intersecting point of said lines on the panel with the axis of pendulum oscillation.

BENNIE V. BEATTY.